April 1, 1924.

B. I. MASUROVSKY 1,488,823

DEVICE TO BE USED IN STANDARDIZING MILKS AND CREAMS

Filed April 13, 1922

Inventor:

Benjamin I. Masurovsky.

Patented Apr. 1, 1924.

1,488,823

UNITED STATES PATENT OFFICE.

BENJAMIN I. MASUROVSKY, OF LINCOLN, NEBRASKA.

DEVICE TO BE USED IN STANDARDIZING MILKS AND CREAMS.

Application filed April 13, 1922. Serial No. 552,439.

*To all whom it may concern:*

Be it known that I, BENJAMIN MASUROVSKY, a subject of Russia, residing at Lincoln, in the county of Lancaster and State of Nebraska, have invented new and useful Improvements in a Device to be Used in Standardizing Milks and Creams, of which the following is a specification.

This invention relates to a slide rule for use by dairymen.

With the centralization of milk depots, creameries, and ice cream plants, the necessity for practical methods of standardizing milks and creams becomes essential. Furthermore, the demand for standardized milk products in the feeding of infants and convalescents, requires that the product shall be standardized not only as regards its butterfat content but also as regards its content of non-fat milk solids. In other words, standardization is complete when the required ratio between the non-fat milk solids and butterfat can be established. The fact that the non-fat solids of milks vary with their specific gravity which in turn varies with the butterfat content of the sample, renders it possible to employ a practical method which takes care of the non-fat solids as well as the butterfat in the standardized product.

Heretofore it has been necessary to compute the percentage contents by formula, applying the rule of alligation. This method, however, is time-consuming and generally unsatisfactory, and it is therefore the primary object of the present invention to provide a slide rule by the use of which such calculations may be made in a more expeditious and more accurate and convenient manner.

Figure 1:
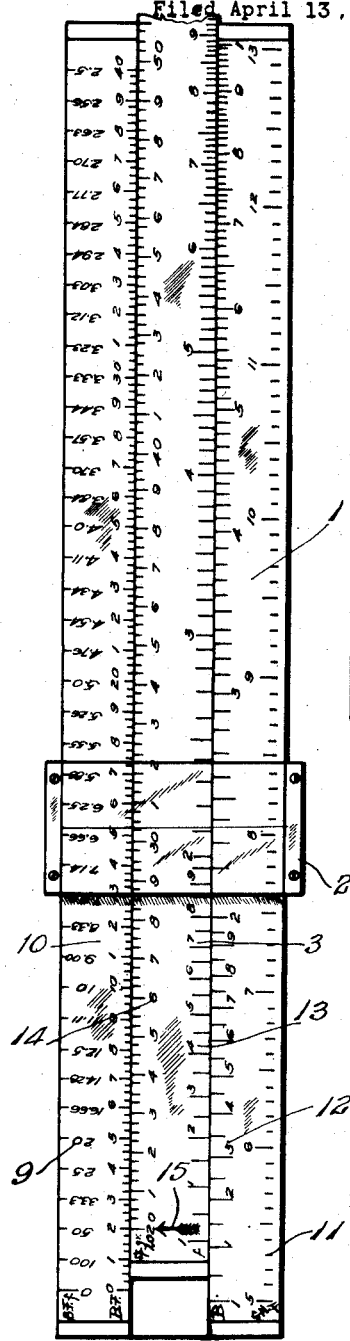
Figure 1 is a plan view of the slide rule embodying the invention.
Figure 2:
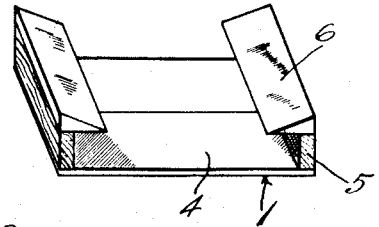
Figure 2 is a sectional perspective view of a portion of the body of the rule.
Figure 3:
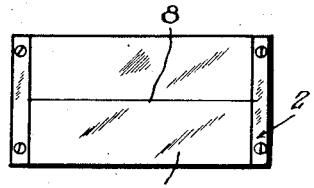
Figure 3 is a plan view of the runner of the slide rule.

The rule embodying the invention comprises a body indicated in general by the numeral 1, a runner indicated in general by the numeral 2, and a slide indicated in general by the numeral 3.

The stock 1 of the rule comprises a base 4 having longitudinal side members 5 and scale bearing members 6 which are mounted upon the upper edges of the said members 5 and are beveled so that they are thinned in the direction of their opposing edges. The thinner edges of the scale bearing members 6 overly the bottom 4 in spaced relation thereto, and the slide 3 is slidably mounted upon the bottom 4 between the upstanding side members 5 and is engaged at its longitudinal edge portions by the overhanging inner edge portions of the scale bearing members 6.

The runner 2 comprises a member 7 which slidably fits the stock 1 and is movable longitudinally thereof and embodies a hair line indicated by the numeral 8, which line extends across the top of the rule above the upper sides of the scale bearing members 6 and the upper side of the slide 3.

One of the scale bearing members 6 is provided upon its inclined or beveled upper face, near its outer edge, with a scale indicated by the numeral 9, and at one end of the scale the said member 6 bears the abbreviation B. F. f. denoting "butterfat factor". The said face of the said member 6 near its inner edge is provided with a scale 10, the marks of which are designated by numerals ranging consecutively from 1 to 9, the 10th mark of the scale being designated by the ordinal 10, the 20th mark by the ordinal 20, the 30th mark by the ordinal 30, etc. The said member 6 likewise bears at one end of the scale 10 the abbreviation B. F. denoting "butterfat".

The other member 6 bears upon its inclined or beveled upper face near its outer edge a scale 11 divided into units and tenths of units which may be suitably designated by ordinals ranging in consecutive order, and at one end of this scale the said member 6 bears the abbreviation S. N. F. denoting "solids not fat", or, as referred to in the present specification, "non-fat solids". The inner edge portion of the said upper face of the member 6 bears a scale 12, the divisions of which are appropriately arranged, the scale comprising main divisions indicated by consecutively arranged ordinals and subdivisions likewise designated. The face of the member 6 bears at one end of this scale the character B denoting one of two logarithmic scales. The slide 3 bears the second of the two logarithmic scales indicated by the numeral 13 and is designated at one end of the scale by the character A. This scale 13 is positioned relatively close to the scale 12 so that the two may be read in conjunction with each other. A scale 14 is similarly arranged upon the face of the slide 3 with relation to the scale 10 and denotes specific gravities, it being so designated by a suitable abbreviation at one end thereof.

In the use of the instrument and in standardizing milk or cream by means of the slide rule embodying the invention, it is necessary to know the percentage of butterfat and specific gravity of the products to be standardized. The percentage of butterfat is determined by the Babcock test, and the specific gravity is determined by the use of a Quevenne lactometer.

In employing the rule, the slide 3 bearing the specific gravity scale 14 is slid within the body of the rule until the point of an arrow 15 upon said slide at one end of the scale registers with the known percentage of butterfat in the scale 10. This having been done the value designating the non-fat solids may be read off on the scale 11, by bringing the hair line of the slide 3 into registeration with the mark of the specific gravity scale 14 corresponding to the specific gravity of the product to be standardized.

The lowest specific gravity on the slide 3 at the arrow bearing end of the slide is 1.020. The runner 2 facilitates the use of the device, it being adapted to be so positioned or adjusted that the hair line of the runner coincides with the known specific gravity whereupon, after obtaining such adjustment, the butterfat factor may be found on the scale 9 opposite the given butterfat value of the product under consideration.

Having thus described the invention, what is claimed as new is:

A device for use in determining factors for the standardization of milk products comprising relatively movable scale members, one of said members bearing a scale denoting percentages of butterfat and a scale denoting percentages of non-fat solids, the other member bearing a specific gravity scale and an indicating pointer located at a fixed point in the said specific gravity scale determined by calculation from a standardizing formula expressing the relationship between the butterfat and non-fat solid contents in ratio to the specific gravity of the product each of the scales being equipart, the specific gravity scale being in juxtaposition to the scale denoting percentages of butterfat, the scale denoting percentages of non-fat solids and the specific gravity scale being coordinated with the scale denoting percentages of butterfat.

BENJAMIN I. MASUROVSKY.